Figure 1:
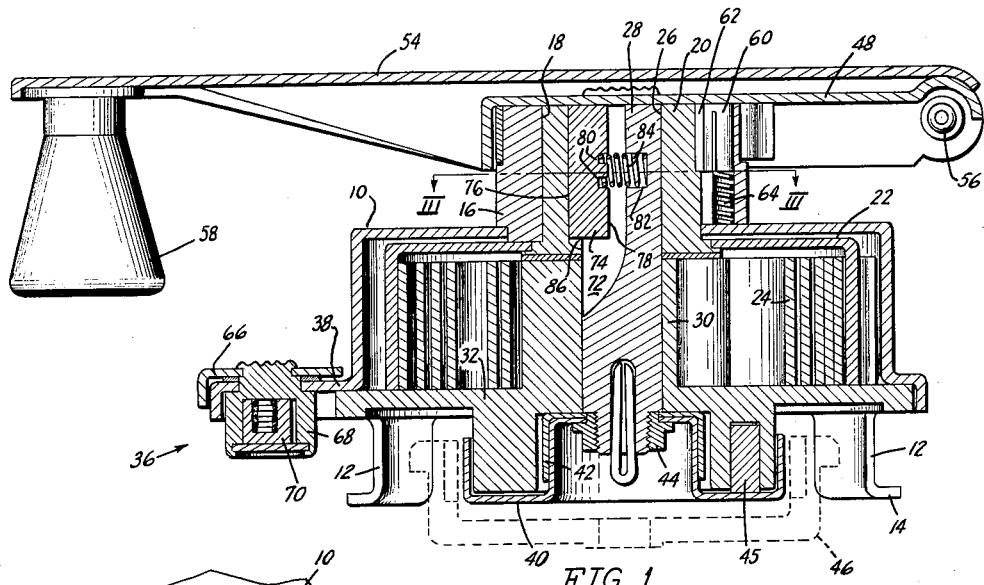

Sept. 14, 1965    L. J. HAMMAN    3,205,881
DOG MECHANISM FOR STARTER
Filed June 20, 1963

INVENTOR
LYLE J. HAMMAN
BY Beaman & Beaman
ATTORNEY

# United States Patent Office 3,205,881
Patented Sept. 14, 1965

3,205,881
DOG MECHANISM FOR STARTER
Lyle J. Hamman, Eaton Rapids, Mich., assignor to Eaton Stamping Company, Eaton Rapids, Mich., a corporation of Michigan
Filed June 20, 1963, Ser. No. 289,377
2 Claims. (Cl. 123—179)

The invention pertains to spring starter structure, and particularly relates to a ratchet dog mechanism for spring starters employed in producing rotation of the starter spring in the winding direction.

In conventional spring starter devices such as the type employed with internal combustion engines used on lawnmowers, small tractors, and the like, the spring starter usually includes a housing attached to the shroud or engine housing. A spiral spring is mounted within the spring starter housing, having one end affixed to a drive member which clutches to the engine crankshaft structure during unwinding of the spring. The other end of the spring is associated with spring winding structure, usually operated by a hand crank. In that the starter spring must be wound in only a single direction to produce the desired cranking rotation, ratchet and dog means are normally employed to limit rotation of the manually operated crank to a spring-winding direction and prevent rotation of the spring winding mechanism in a spring-unwinding direction.

It is an object of the invention to provide a dog mechanism for spring starters wherein unidirectional rotation between the manually operated crank and spring-winding mechanism is produced so that a greater contact area between the spring-winding mechanism and the manually operated crank is achieved than was heretofore possible. Previously, sliding pin dogs and other conventional dog devices have been used with this type of structure. Although such conventional dog structures are operable, a high pressure is produced on the area of the dog engaged by the spring-windinng structure, and it is not unusual as the spring nears its fully wound condition for the dog to "Brinell" and deform. Also, several types of dog structure employed in this environment do not necessarily always fully engage the ratchet teeth of the spring-winding structure, and such partial dog engagement causes deleterious effects, in that the reduced contact area between the dog and the spring-winding structure produces very high pressures on the dog, tending to deform and damage the dog.

It is, therefore, another object of the invention to provide a dog for a spring starter wherein positive engagement between the dog and the associated ratchet teeth of the spring-winding mechanism is assured.

A further object of the invention is to provide a dog for a spring starter wherein the dog structure is economical to produce and manufacture and wherein improved operational characteristics are provided.

Figure 3:
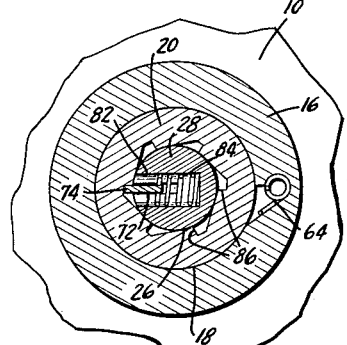
Figure 2:
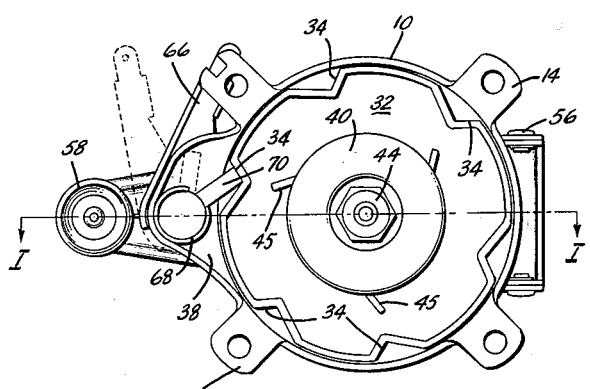
Figure 4:
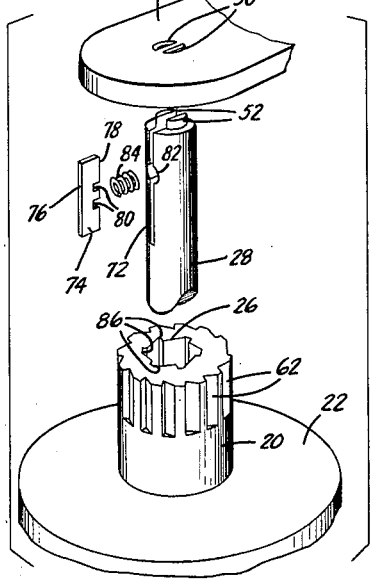

These and other objects of the invention arising from the details and relationships of the components of an embodiment thereof will be apparent from the following description and accompanying drawings wherein:

FIG. 1 is an elevational, diametrical, sectional view of a spring starter employing the improved dog mechanism, illustrating the dog mechanism in the fully engaged position, FIG. 2 is an underside view of the starter of FIG. 1, illustrating the release mechanism for the drive member in the operative position in full lines and in the inoperative "released" position in dotted lines, FIG. 3 is a plan, detail, sectional view of the dog mechanism and associated starter structure, as taken along section III—III of FIG. 1, and FIG. 4 is a detail, exploded, perspective view of the starter components directly associated with the dog mechanism of the invention.

A spring starter employing the concept of the invention may include a housing 10 having downwardly projecting legs 12 defined thereon, whereby the housing 10 may be affixed to an internal combustion engine by means of bolts or other fastening devices extending through the horizontal flange portions 14 of the legs. A bearing member 16 is affixed to the upper portion of the housing 10 concentric thereto, and includes an internal bore 18 in which a rotatable member 20 is journaled. The rotatable member 20 has a cup-like spring keeper 22 affixed thereto, adapted to encompass the spiral spring 24. The outer end of the spring 24 is affixed to the spring keeper cup 22. The rotatable member 20 is provided with an internal bore 26 rotatably receiving a shaft 28. A drive member 30 is rotatably mounted on the lower portion of the shaft 28 and includes a radially extending portion 32 having abutments 34, FIG. 2, defined adjacent the periphery thereof for selective association with release means 36 mounted on the housing portion 38. The inner end of the spring 24 is connected to the drive member 30. Clutch structure is mounted on the lower portion of the drive member 30, and includes a clutch dog retainer 40 and a friction brake element 42 affixed to the end of the shaft 28 by a nut 44. The clutch dogs 45 are supported on drive member 30 and are adapted to engage the internal combustion engine cup 46, shown in dotted lines in FIG. 1, which is associated with the engine crankshaft structure.

A crank is affixed to the upper end of the shaft 28 and includes a handle portion 48 having a pair of openings 50 defined thereon adapted to receive projections 52 formed on the upper end of the shaft, FIG. 4. The shaft 28 is affixed to the handle portion 48 by inserting the projections 52 through the openings 50 and swaging or peening the projections over on the handle portion. The hinged handle portion 54 is pivotally attached at 56 to the handle portion 48, whereby the shaft 28 may be rotated by the crank knob 58. Unidirectional drive structure is mounted on the shaft 28 and operatively associates with the rotatable member 20, as will be described later. A dog 60 is mounted within the bearing member 16 adapted to engage ratchet teeth 62 defined on the exterior of the rotatable member 20, and the spring 64 biases the dog 60 toward the teeth 62. The dog 60 prevents rotation of the rotatable member 20 in a direction which would unwind the spring 24. The above described structure, except for the unidirectional structure between shaft 28 and member 20, is quite similar to the starter components illustrated in my United States Patent No. 3,081,760, and the details of the similar components will be appreciated from the patent.

The release means 36 mounted on the housing portion 38 includes a release lever 66 affixed to a release dog support member 68 which carries a release dog 70. The release dog 70 is adapted to be positioned from the operative full line position of FIG. 2 to the dotted "release" position of FIG. 2 to selectively permit or prevent rotation of the drive member 30. The details of the construction of this release means are the subject matter of my copending United States application Serial No. 289,355, filed June 20, 1963.

The unidirectional drive connection between the shaft 28 and the rotatable member 20 includes a radially disposed axially extending slot 72 defined in the shaft 28. An elongated planar plate 74 is received within the slot 72 and is of a slightly less thickness than that of the slot 72 whereby the plate is radially slidable within the slot. The plate 74 includes an outer longitudinal edge 76 and an inner longitudinal edge 78. A pair of spaced notches 80 are defined within the inner longitudinal plate edge 78. A blind, cylindrical, radially extending hole 82 is formed in the shaft 28 having an axis within the plane of the slot 72 whereby the hole 82 is symmetrically related to the slot. A coil compression spring 84 is received within the hole 82 and the notches 80 are spaced so as to receive the end coils of the spring 84, as will be apparent from FIG. 1. It will be appreciated, therefore, that the spring 84 biases the plate 74 radially, outwardly with respect to the shaft 28, and that the engagement of the end of the spring 84 and the notches 80 axially locates the plate within the slot 72.

The bore of the rotatable member 20 is provided with a plurality of ratchet teeth 86, six in the disclosed embodiment, which selectively cooperate with the dog plate 74. The ratchet teeth 86 extend substantially the axial length of the rotatable member 20, FIG. 1. The dog plate 74, therefore, engages the ratchet teeth 86 through a considerable axial length, and as the plate 74 is of a substantial longitudinal length, as compared with its width, a substantial contact area between the dog plate 74 and a ratchet tooth 86 will be achieved, resulting in low surface unit pressures on the dog plate during spring winding, which eliminates damage to the plate.

In that the plate 74 is being constantly urged radially, outwardly by the spring 84, a positive full engagement between the plate 74 and a ratchet tooth 86 is assured. This fact is of importance in preventing high surface pressures on the plate 74 which may result from a partial engagement of the shaft dog and the rotatable member such as may occur in the starter construction of United States Patent No. 3,081,760.

It is appreciated that modifications to the described embodiment may be apparent to those skilled in the art without departing from the spirit and scope thereof, and it is intended that the invention be defined only by the scope of the following claims.

I claim:
1. A spring starter for internal combustion engines comprising, in combination,
   (a) a housing adapted to be mounted on an internal combustion engine,
   (b) a rotatable member rotatably mounted within said housing, having a central bore defined therein extending concentrically therethrough,
   (c) a drive member rotatably mounted within said housing,
   (d) clutch means mounted on said drive member,
   (e) a spiral spring connected to said rotatable member and said drive member,
   (f) releasable locking means selectively preventing and permitting rotation of said drive member,
   (g) locking means interposed between said housing and rotatable member preventing rotation thereof in a direction permitting said spring to unwind,
   (h) a crank rotatably mounted on said housing,
   (i) a shaft affixed to said crank concentrically and rotatably extending through said bore of said rotatable member,
   (j) a blind, elongated, axially extending slot defined in said shaft, said shaft having a closed end defined in said shaft and intersecting the exterior surface of said shaft at a single location on a given side,
   (k) an elongated, planar plate slidably supported within said slot both axially and radially of said shaft having an inner edge and adapted to project therefrom,
   (l) a transversely extending, blind hole defined in said shaft having an axis lying within said slot, said hole extending into said shaft to a depth greater than the projection of said plate into said slot and including a closed end,
   (m) a notch defined within said plate inner edge,
   (n) a spring received within said hole interposed between said plate and hole closed end biasing said plate outwardly relative to said shaft, and
   (o) ratchet teeth defined in the bore of said rotatable member adapted to cooperate with said plate whereby said plate and ratchet teeth establish a unidirectional drive connection between said shaft and said rotatable member.

2. In a spring starter for internal combustion engines, a dog and shaft subassembly comprising, in combination,
   (a) a shaft having an exterior surface,
   (b) an axially extending, radial slot defined in said shaft, said slot intersecting said shaft exterior surface at a single location on a given side of said exterior surface, said slot having a closed end defined within said shaft,
   (c) a planar, elongated plate having an axial longitudinal length substantially greater than the width thereof slidably mounted both axially and radially of said shaft within said slot and adapted to extend therefrom,
   (d) a radially extending hole having a closed end defined in said shaft, said hole diametrically intersecting said slot,
   (e) an inner, longitudinal edge defined on said plate,
   (f) a notch defined within said plate inner edge, and
   (g) a coil compression spring received within and slidably fitting said hole, said spring including a first end engaging said hole closed end and a second end received within said notch, thereby axially positioning said plate within said slot.

References Cited by the Examiner

UNITED STATES PATENTS

| | | | |
|---|---|---|---|
| 641,638 | 1/00 | Collns | 192—46 |
| 2,333,549 | 11/43 | Novak | 192—43.2 |
| 3,081,760 | 3/63 | Hamman | 123—179 |

RICHARD B. WILKINSON, *Primary Examiner.*